Sept. 18, 1928.  1,684,683
W. J. RADKE
SPEEDOMETER AND INDICATOR
Filed Jan. 23, 1924   3 Sheets-Sheet 1
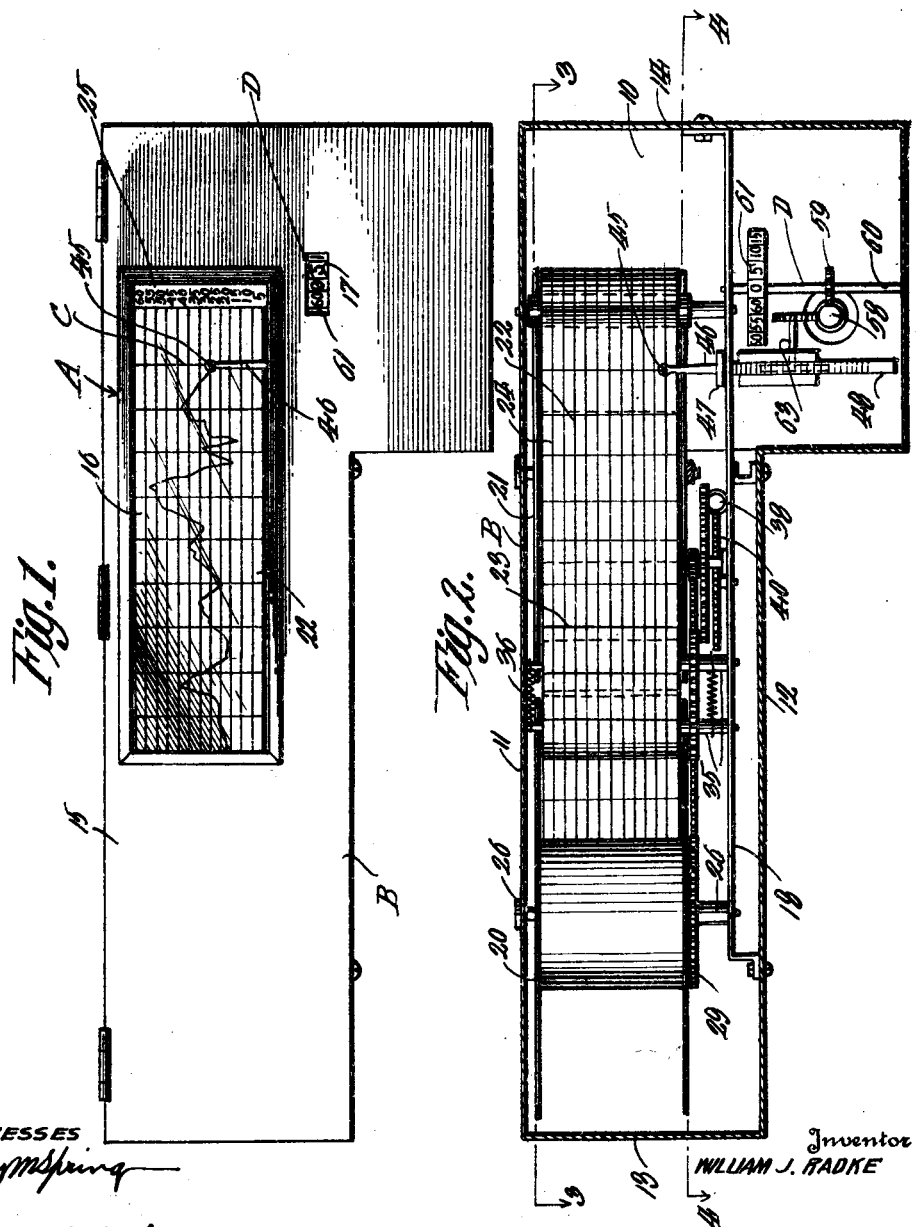
WITNESSES
Inventor
WILLIAM J. RADKE
By Richard B. Owen
Attorney

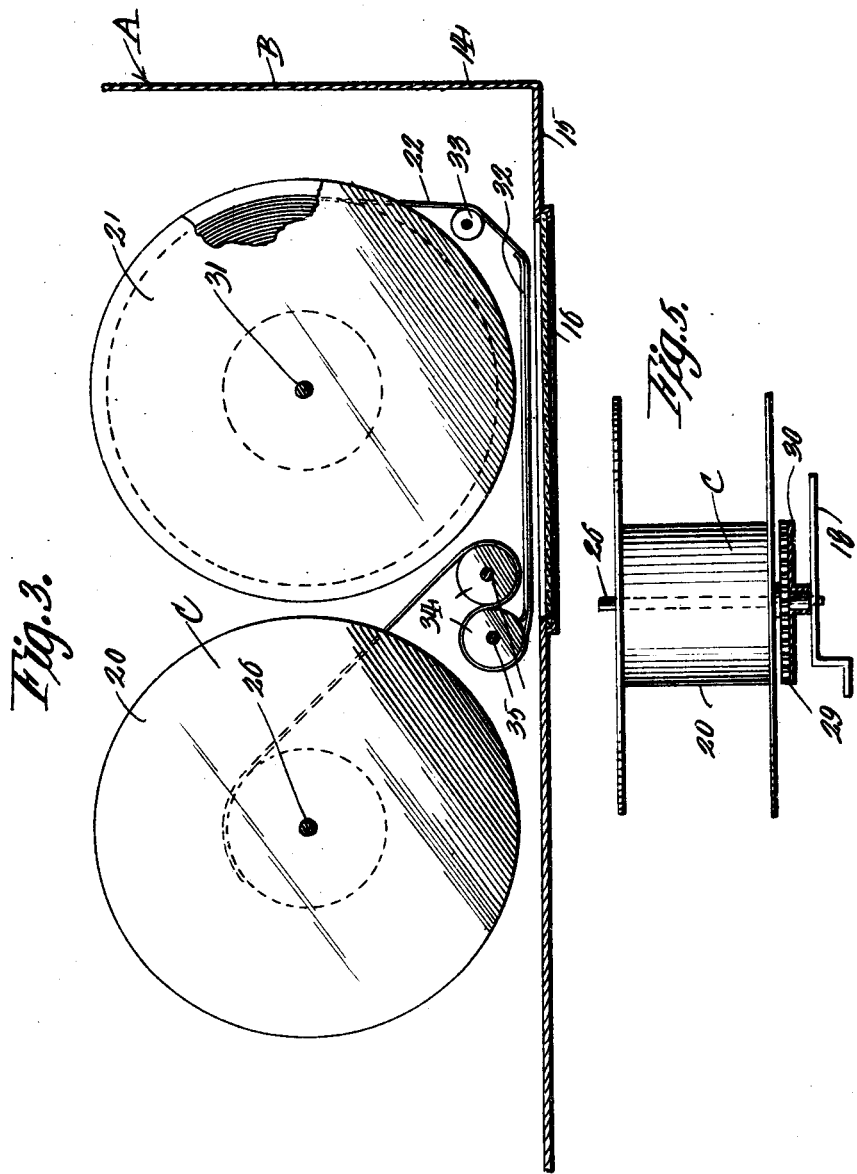

Sept. 18, 1928.
W. J. RADKE
1,684,683
SPEEDOMETER AND INDICATOR
Filed Jan. 23, 1924   3 Sheets-Sheet 3
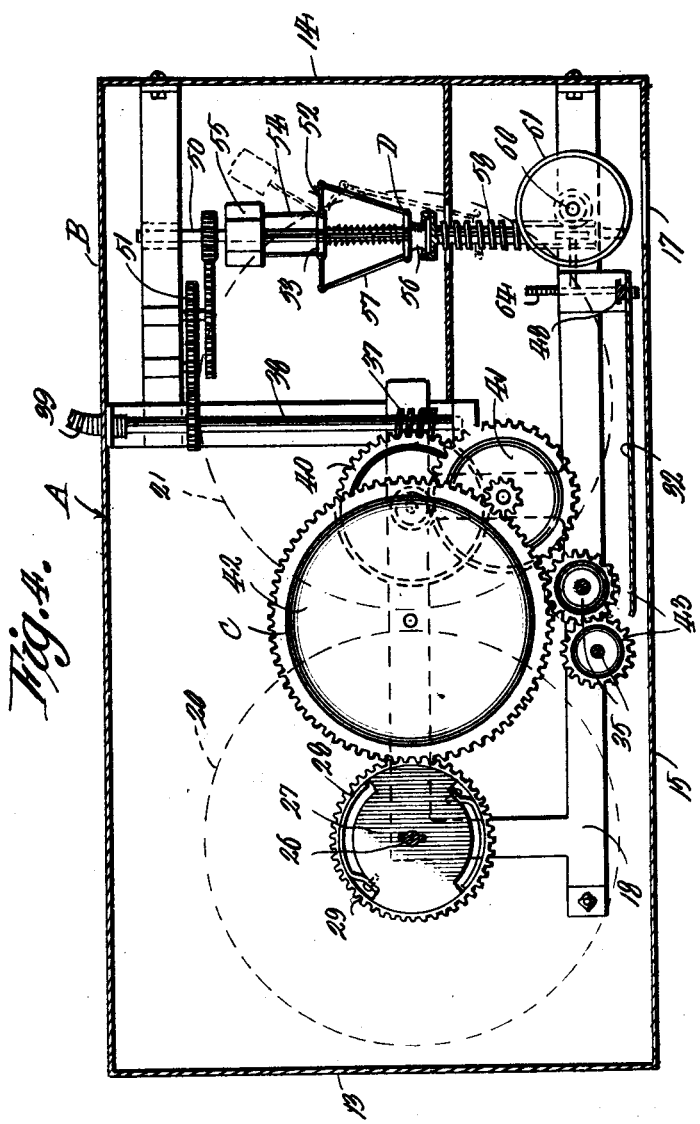
WITNESSES
Inventor
WILLIAM J. RADKE
By Richard B. Owen, Attorney Patented Sept. 18, 1928.

1,684,683

UNITED STATES PATENT OFFICE.

WILLIAM J. RADKE, OF MARMARTH, NORTH DAKOTA.

SPEEDOMETER AND INDICATOR.

Application filed January 23, 1924. Serial No. 688,025.

This invention appertains to speed indicating devices for motor vehicles and the like and the primary object of the invention is to provide a novel device used in conjunction with a speedometer for keeping a record of the exact speed of travel over a predetermined length of roadway.

Another object of the invention is the provision of a combined recorder and speedometer embodying a record strip moved at a predetermined amount for each mile of roadway traverse, and novel means for marking upon the strip the different speeds obtained by the vehicle during the travel of the vehicle over the roadway.

A further object of the invention is the provision of novel means for operating the record strip from the drive shaft of the speedometer and novel means for actuating the marking instrument from the speedometer.

A further object of the invention is the provision of a novel compensating device for the takeup reel for the record strip, so that the proper amount of the strip will be taken up on the wheel irrespective of the diameter of the strip being wound upon the reel.

With these and other objects in view, the invention consists in the novel construction, arrangement and formation of parts, as will be hereinafter more specifically described, claimed and illustrated in the accompanying drawings, in which drawings:

Figure 1 is a front elevation of the improved speedometer and indicator.

Figure 2 is a vertical section taken longitudinally through the improved device.

Figure 3 is a detail horizontal section through the device taken on the line 3—3 of Figure 2.

Figure 4 is a horizontal section taken through the improved device on the line 4—4 of Figure 2 illustrating the means for operating the record or feed rolls for the record strip or tape and the takeup reel for the tape and the operating means for the usual speedometer, and Figure 5 is a detail section illustrating the takeup reel, Referring to the drawings in detail, wherein similar reference characters designate corresponding parts throughout the several views, the letter A generally indicates the improved device, which comprises a casing B for receiving the indicating and recording device C and the speedometer D.

While the recording and indicating device C can take the place of the usual odometer, if so desired, the ordinary type of odometer for recording the number of miles traversed, the trip and the like can be incorporated with the improved device A.

The casing B can be constructed of any desired material, such as sheet metal or the like and embodies a rear wall 10, a top wall 11, a bottom wall 12 and end walls 13 and 14. As shown the casing is enlarged at one end for the reception of the speedometer D and it is preferred to close the open end of the casing by a suitable hinged door or the like 15. This hinged door 15 is provided with a transparent panel 16 so as to permit the recording appliance C to be readily viewed by the driver of the automobile. The door 15 is also provided with a slot or sight opening 17 so that the indicating portion of the speedometer can be seen therethrough.

Arranged within the casing B is a supporting frame 18 which can be of the desired shape for supporting the various shafts and pintles of the improved appliance. This frame 18 is preferably secured to the bottom wall 12 and one end wall 14.

The improved indicator or recorder C comprises the takeup reel 20 arranged at one end of the casing B and the record strip paying out reel 21 at the other end thereof. The record strip or ribbon is indicated by the reference character 22 and the reels are designed to hold from five to ten thousand miles of travel recorded on the strip. The strip is divided by transverse lines 23 preferably disposed a one half inch apart and the strip is designed to be moved one half inch for every mile of travel. The strip is first wound upon the paying out reel 21 after which the same is to be wound onto the takeup reel 20. The strip is also divided by longitudinally extending spaced parallel lines 24 and these lines indicate the various speeds and it is preferred to have the glass panel provided with an indicating strip 25 at one end bearing suitable indicia such as the number of miles per hour each longitudinal line indicates.

The takeup reel 20 is keyed to a suitable supporting shaft 26 which is rotatably mounted in the top wall 11 and in the frame 18. This shaft also has keyed thereto a clutch plate 27 carrying arcuate leaf springs 28 which are designed to frictionally engage the inner surface of a ring gear 29 which is held on the clutch plate by a suitable holding disk 30 shown in Figure 5 of the drawings. The purpose of the clutch plates and springs will be hereinafter more fully described. The paying out reel 21 is preferably rotatably mounted upon a suitable shaft 31 which can be carried by the top wall 11 and the frame 18.

A rigid supporting platen 32 is arranged within the casing B directly in rear of the transparent panel 16 and as shown, the recording tape or ribbon is fed over this platen. A suitable guide roller 33 is disposed between the paying out reel 21 and the platen 32 so as to prevent the breaking of the strip or ribbon, and this roller can be mounted upon a suitable shaft arranged between the wall 11 and the frame 18.

In order to feed the record strip or ribbon 22 the correct distance per mile of travel, a pair of feed rollers 34 are provided. These feed rollers 34 are arranged directly between the paying out reel 21 and the takeup reel 20 and are disposed directly at the left of the platen 32. As shown, the tape or record strip is fed over one feed roller and then over the other. When the tape is initially placed in position after the same has been threaded through the machine, the same is adapted to be secured to the hub of the reel 20 in any desired way, such as by a spring clip or the like. These rollers are mounted upon suitable supporting shafts 35 which can be slidably mounted in suitable bearing slots formed in the rear wall 11 and the frame 18. In order to maintain the rollers 34 in frictional contact with one another, the same are urged toward each other by suitable contractible coil springs 36. It also can be seen that these rollers can be readily separated when the record strip, ribbon or tape 22 is being threaded between and around the same.

In order to drive the feed rollers 34 at the correct rate of speed in accordance with the speed of travel of the automobile, a worm 37 is formed on the inner end of the drive shaft 38 which extends into the casing B. This drive shaft can be supported by suitable bearings carried by the frame 18. The shaft 38 is driven from any suitable type of flexible shaft 39, which can in turn be driven from any desired part of the vehicle, such as one of the front steering wheels thereof. This worm 37 meshes with a worm wheel 40 which through a suitable train of gearing 41 operates a main drive gear 42. This main drive wheel 42 meshes with one of the pinions 43 which are keyed or otherwise secured to the shaft 35 of the roller 34. It is to be also noted that these pinions 43 mesh with one another. Thus it can be seen that the takeoff or feed rollers 34 are driven directly from the drive shaft 38 through a suitable train of reduction gearing.

The main drive gear 42 also meshes with the ring gear 29 so as to rotate the takeup reel 20 and thus permit the same to take up the record strip or ribbon as the same is fed from off the feed rollers 34.

Now it is obvious that as a greater amount of the strip is rolled up on the hub of the takeup reel, that the amount of strip on the hub will increase in diameter and in order to compensate for the difference in the amount of strip the spring 28 and the clutch disc 27 will permit the ring gear 29 to slip which will prevent the takeup reel from pulling the ribbon too fast from off the feed rollers 34.

The stylus or marking point 45 is mounted within a suitable holder 46, and this holder is slidably mounted in a guide 47 carried by the frame 18. The shank portion 48 of the holder 46 is provided with rack teeth and gears operated from the speedometer mechanism D, which will be now described.

The speedometer mechanism D comprises a driven shaft 50 which is operatively connected to the drive shaft 38 through a train of suitable gearing 51. This shaft 50 has mounted thereon a governor 52 which as shown embodies a collar 53 secured to the shaft having a plurality of bell cranks pivoted at their angle thereto. The upper terminals of the bell crank levers 54 have secured thereto suitable weights 55 which are adapted to move outwardly different distances according to the speed of rotation of the shaft. The short arms of the bell crank levers 54 are operatively connected to a sliding collar 56 through the medium of links 57 and this collar is of course adapted to be lowered when the weights 55 move outwardly. This sliding collar 56 is connected with a movable rack bar 58. The rack bar 58 has meshing therewith a pinion 59 which is keyed to a shaft 60, that supports the indicating wheel 61 of the speedometer. The indicating wheel 61 has suitable indicia stamped or otherwise affixed thereon which is adapted to show through the slot 17.

The rack 58 has also meshing therewith a second pinion 62 which is keyed to a counter shaft 63. A second pinion 64 is carried by the counter shaft 63 and meshes with rack teeth of the shank 48 of the arm 46 which carries the stylus 45.

In operation of the improved device, the tape or ribbon 22 is fed off the paying out reel 21 by the recording or feed rollers 34 across the platen at the desired distance per mile of travel. As the tape recording strip or ribbon is moved across the platen, the holder or arm 46 is moved back and forth across the recording strip or tape according to the movement of the rack bar 58 and the stylus 45 marked upon the ribbon or recording strip the rate of speed obtained during each mile of travel.

From the foregoing description, it can be seen that a novel speedometer has been provided, in which a positive record can be obtained of the speed of a vehicle of any predetermined distance of travel.

Changes in details may be made without departing from the spirit or the scope of this invention.

What I claim as new is:

In recording mechanism, means for effecting feed of a record strip comprising a supply reel from which the strip is to be unwound, a take-up reel upon which the strip is to wound, a shaft upon which the said take-up reel is fixedly mounted, a disk fixed upon the shaft for rotation therewith, a ring gear fitted to the periphery of the disk and rotatable with respect to the disk, the disk having recesses in its periphery, resilient clutch members mounted in said recesses in the disk and bearing frictionally against the inner periphery of the ring gear to frictionally clutch the gear with the disk, a main drive gear in mesh with the ring gear, a shaft the revolutions of which are to be recorded upon the record strip, guide rolls about which a portion of the strip which extends between the supply reel and the take-up reel is reversely wound, gears upon the rolls meshing with each other to provide for rotation of the rolls in unison, one of said gears being in mesh with the main drive gear, and a gear train interposed between the last mentioned shaft and the said main drive gear.

In testimony whereof I affix my signature.

WILLIAM J. RADKE.